(12) United States Patent
Tetsumura et al.

(10) Patent No.: US 11,118,054 B2
(45) Date of Patent: Sep. 14, 2021

(54) OIL GEL, PRESSURE PROOF MATERIAL FOR PROTECTING ELECTRONIC DEVICE USING THIS OIL GEL, AND OIL GEL FORMER

(71) Applicant: SEC-Seaprex Ltd., Hakodate (JP)

(72) Inventors: Koutaro Tetsumura, Hakodate (JP); Nariyuki Mohnai, Hakodate (JP)

(73) Assignee: SEC-Seaprex Ltd., Hakodate (JP)

( * ) Notice: Subject to any disclaimer, the term of this patent is extended or adjusted under 35 U.S.C. 154(b) by 42 days.

(21) Appl. No.: 16/478,189

(22) PCT Filed: Jan. 16, 2018

(86) PCT No.: PCT/JP2018/001034
§ 371 (c)(1),
(2) Date: Jul. 16, 2019

(87) PCT Pub. No.: WO2018/135494
PCT Pub. Date: Jul. 26, 2018

(65) Prior Publication Data
US 2019/0367728 A1  Dec. 5, 2019

(30) Foreign Application Priority Data

Jan. 17, 2017 (JP) .............................. JP2017-006217

(51) Int. Cl.
| | | |
|---|---|---|
| C08L 75/04 | (2006.01) | |
| C08G 18/67 | (2006.01) | |
| C08G 18/75 | (2006.01) | |
| C08L 91/00 | (2006.01) | |
| C08G 18/08 | (2006.01) | |
| C08G 18/62 | (2006.01) | |

(52) U.S. Cl.
CPC .......... *C08L 75/04* (2013.01); *C08G 18/0852* (2013.01); *C08G 18/6208* (2013.01); *C08G 18/67* (2013.01); *C08G 18/75* (2013.01); *C08G 18/758* (2013.01); *C08L 91/00* (2013.01); *C08G 2220/00* (2013.01)

(58) Field of Classification Search
CPC ...... C08G 18/67; C08G 18/75; C08G 18/758; C08G 18/0852; C08G 18/6208; C08G 2220/00; C08L 75/04; C08L 91/00
See application file for complete search history.

(56) References Cited

FOREIGN PATENT DOCUMENTS

| | | |
|---|---|---|
| JP | 9274990 A | 10/1997 |
| JP | 63130616 A | 6/1998 |
| JP | 1121540 A | 1/1999 |
| JP | 2002121254 A | 4/2002 |
| JP | 3936386 B1 | 6/2007 |
| JP | 4221510 B1 | 2/2009 |

OTHER PUBLICATIONS

Machine English translation of JP 1988-130616, Okano et al., Jun. 2, 1988.*
Author Unknown, Blackgold Lubricants Specialist Product Bulletin "Rubber Processing Oil", Aug. 2013, one page.*
Engineering Tool Box, (2003). Absolute, Dynamic and Kinematic Viscosity, [online] Available at: https://www.engineeringtoolbox.com/dynamic-absolute-kinematic-viscosity-d_412.html [Accessed Dec. 11, 2020], 14 pages.*

* cited by examiner

*Primary Examiner* — Patrick D Niland
(74) *Attorney, Agent, or Firm* — The Webb Law Firm (57) ABSTRACT

Provided is an oil gel comprising a chain polyurethane (A) and a paraffin based oil (B), wherein the chain polyurethane (A) is a chain polyurethane (A1) formed by polymerization of a chain diol (x) and a diisocyanate (y), and the paraffin based oil (B) is a paraffin based oil (B1) having a kinetic viscosity at 40° C. of 20 mm$^2$/s or more and 100 mm$^2$/s or less, and the chain polyurethane (A1) is included at a proportion of 10% by mass or more and 50% by mass or less based on the total amount of the chain polyurethane (A1) and the paraffin based oil (B1). Also provided is a pressure proof material for protecting an electronic device.

8 Claims, 2 Drawing Sheets

OIL GEL, PRESSURE PROOF MATERIAL FOR PROTECTING ELECTRONIC DEVICE USING THIS OIL GEL, AND OIL GEL FORMER

CROSS-REFERENCE TO RELATED APPLICATIONS

This application is the United States national phase of International Application No. PCT/JP2018/001034 filed Jan. 16, 2018, and claims priority to Japanese Patent Application No. 2017-006217 filed Jan. 17, 2017, the disclosures of which are hereby incorporated by reference in their entirety.

BACKGROUND OF THE INVENTION

Technical Field

The present invention pertains to the field of pressure proof techniques for protecting an electronic device used in water (in particular, deep sea) from hydraulic pressure. Specifically, the present invention relates to an oil gel having very good pressure proof properties, a pressure proof material for protecting an electronic device using this oil gel, and an oil gel former.

Background Art

In recent years, for the purpose of, for example, developing marine resources or assessing marine environment, use of electronic devices such as marine sensors and electron cameras in water has been increasing. When an electronic device is used in water, the electronic device is subjected to hydraulic pressure. When an electronic device is encased in a closed container to use the electronic device in water, the electronic device is subjected to pressure generated by a gas filled in the container. By contrast to atmospheric pressure, the pressure values of the hydraulic pressure and the gas pressure fluctuate.

However, electronic devices are composed of components based on the premise that the components are used at atmospheric pressure and, at the same time, are used under conditions without fluctuation in pressure values, and electronic devices are not intended to be used in the environment under pressure other than atmospheric pressure (such as hydraulic pressure or the gas pressure), or used under conditions with fluctuation in pressure values. Therefore, when an electronic device is used in water, imperfections in the electronic device such as physical failure, loss of synchronization of clocks and malfunction may occur due to the influence of hydraulic pressure or the gas pressure on the electronic device, or due to the fluctuation of these pressure values (pressure fluctuation). Imperfections such as leak resulted from water intrusion or condensation, or electric failure resulted from short circuit in circuitry may also occur.

In order to avoid imperfections in an electronic device as described above such as physical failure, loss of synchronization of clocks, malfunction, leak and electric failure, there is a need for a technique for protecting the electronic device from pressure so that the electronic device is not influenced by hydraulic pressure or pressure fluctuation (pressure proof technique). As pressure proof techniques, pressure shell processes and oil sealing processes are known.

The pressure shell process is a classical method for encasing an electronic device in a robust pressure shell made of titanium, special stainless steel or the like together with an inert gas (mainly nitrogen gas). However, the pressure shell process has the following problems: the manufacturing cost of the pressure shell is very high, in addition, this process is frequently influenced by pressure fluctuation, and in particular, leak resulted from water leakage or condensation tends to occur.

On the other hand, the oil sealing process is a method for filling the interior of a container containing an electronic device with an insulating oil (such as machine oils and greases). According to this method, an electronic device is covered with an insulating oil layer consisting of an insulating oil. Therefore, even when the insulating oil layer is subjected to high hydraulic pressure, the hydraulic pressure is distributed over the entirety of the insulating oil layer (hydraulic pressure is equalized), and as a result of this, the influence of the hydraulic pressure on the electronic device can be minimized. Because the insulating oil layer makes it difficult for the intrusion of moisture to occur, leak resulted from water leakage or condensation can be effectively prevented.

However, the oil sealing process has the following problems.
(1) The electronic device is required to be covered with a protective coat in advance so that the electronic device does not come into direct contact with an insulating oil, and as a result of this, the equipment configuration is complicated.
(2) In order to avoid the leakage of the insulating oil in the sea, an oil-tight structure is needed, and as a result of this, the equipment cost and the maintenance cost increase.

Therefore, a technique for encompassing an electronic device by a resin material instead of an insulating oil has been proposed. For example, a technique for encompassing a measuring platform by a pressure cushioning gel made of a highly elastic material has been proposed (see patent literatures 1 and 2). In techniques described in patent literatures 1 and 2, collagenous or gelatinous macromolecular protein derived from marine organisms and having high biodegradability is used as a highly elastic material.

Patent Literature

Patent Literature 1: Japanese Patent No. 3936386
Patent Literature 2: Japanese Patent No. 4221510

SUMMARY OF INVENTION

The pressure cushioning gel described in patent literature 1 or patent literature 2 exhibits good pressure proof properties and waterproof properties as long as hydraulic pressure is at a level of 2 MPa (corresponding to a depth of water in the sea of 200 m<also referred to as "surface layer" or "surface mixed layer".>). However, in the zones having the depth of water deeper than that of the surface mixed layer, for example, at a hydraulic pressure level of 5.6 MPa or more (corresponding to the deep sea at a depth of water of 548.64 m or deeper <300 fathoms or deeper, "abyssal">), the pressure proof properties and the waterproof properties of this pressure cushioning gel is still deficient. More specifically, there is the following problem: imperfections such as physical failure, loss of synchronization of clocks and malfunction, leak and electric failure in the electronic device are caused by hydraulic pressure on the electronic device, and rapid fluctuation in pressure. The following trouble may occur: the pressure proof gel is damaged by high hydraulic pressure or rapid fluctuation in pressure, and water intrudes from the damaged portion.

The present invention solves problems associated with prior art as described above. In other words, the present invention provides a pressure proof material for protecting an electronic device, the pressure proof material not requiring a protective coat and an oil-tight structure as in the oil sealing process, and the pressure proof material exhibiting very good pressure proof properties and waterproof properties even at a hydraulic pressure level of 5.6 MPa or more (corresponding to the deep sea at a depth of water of 548.64 m or deeper).

The present inventors have made diligent studies to solve the problems in the prior art. As a result of these studies, the present inventors have found that:

(1) a composition including a polyurethane also having a chain structure (chain polyurethane) forms an oil gel in an oil containing a chain saturated hydrocarbon compound as a main ingredient (paraffin based oil); and (2) only a composition including the chain polyurethane at a certain content forms an oil gel having very good pressure proof properties and waterproof properties; and have accomplished the present invention. In other words, the problems are solved by the present invention described below.

[1] Oil gel:

The oil gel of the present invention is an oil gel including a chain polyurethane (A) and a paraffin based oil (B), wherein the chain polyurethane (A) is a chain polyurethane (A1) formed by polymerization of a chain diol (x) and a diisocyanate (y), and the chain diol (x) is a compound obtained by replacing two hydrogen atoms in a chain saturated hydrocarbon compound with hydroxy groups, and the diisocyanate (y) is a compound obtained by replacing two hydrogen atoms in a saturated hydrocarbon compound with isocyanate groups, and the paraffin based oil (B) is a paraffin based oil (B1) having a kinetic viscosity at 40° C. of 20 $mm^2$/s or more and 100 $mm^2$/s or less, and the chain polyurethane (A1) is included at a proportion of 10% by mass or more and 50% by mass or less based on the total amount of the chain polyurethane (A1) and the paraffin based oil (B1).

[2] Pressure Proof Material:

The pressure proof material of the present invention is a pressure proof material for protecting an electronic device consisting of an oil gel described in the above [1].

[3] Oil Gel Former:

The oil gel former of the present invention is an oil gel former comprising a first solution including a chain diol (x) obtained by replacing two hydrogen atoms in a chain saturated hydrocarbon compound with hydroxy groups; and a paraffin based oil (B1) having a kinetic viscosity at 40° C. of 20 $mm^2$/s or more and 100 $mm^2$/s or less, in combination with a second solution including a diisocyanate (y) obtained by replacing two hydrogen atoms in a saturated hydrocarbon compound with isocyanate groups; and a paraffin based oil (B1) having a kinetic viscosity at 40° C. of 20 $mm^2$/s or more and 100 $mm^2$/s or less, wherein when the first solution and the second solution are mixed, a chain polyurethane (A1) is formed by the polymerization of the chain diol (x) in the first solution and the diisocyanate (y) in the second solution, and wherein the first solution and the second solution include the chain diol (x), the diisocyanate (y), and the paraffin based oil (B1) such that 10% by mass or more and 50% by mass or less of the chain polyurethane (A1) is formed based on the total amount of the chain polyurethane (A1), the paraffin based oil (B1) included in the first solution, and the paraffin based oil (B1) included in the second solution.

The oil gel of the present invention can be used with being directly exposed to the sea water, and has an effect of, even when the oil gel of the present invention is subjected to high hydraulic pressure, distributing this hydraulic pressure over the entirety of the oil gel so that this hydraulic pressure is equalized (hydraulic pressure equalizing effect). Therefore, the oil gel exhibits very good pressure proof properties and waterproof properties even at a hydraulic pressure equal to or greater than an equalizing hydraulic pressure level of 5.6 MPa (corresponding to the deep sea at a depth of water of 548.64 m or more).

The oil gel of the present invention tends not to be influenced by pressure fluctuation in comparison to as in the pressure shell process, and can effectively prevent leak resulted from water leakage or condensation in particular. In addition, the oil gel of the present invention does not require the use of a pressure shell, which is a heavy component and is large equipment, and can make the entirety of an apparatus including an electronic device smaller and lighter, and can reduce the manufacturing cost of equipment.

The oil gel of the present invention does not require protective coats and oil-tight structures as in the oil sealing process. As a result of this, the equipment configuration including an electronic device can be simplified, and the manufacturing cost of equipment and the maintenance cost of equipment can be reduced.

In addition, even at a hydraulic pressure level of 5.6 MPa (corresponding to the deep sea at a depth of water of 548.64 m), the oil gel of the present invention can protect an electronic device included from hydraulic pressure and rapid pressure fluctuation, and can effectively prevent imperfections in the electronic device such as physical failure, loss of synchronization of clocks, malfunction, leak and electric failure. The oil gel of the present invention does not tend to be damaged by the hydraulic pressure or rapid pressure fluctuation, and therefore, can effectively reduce imperfections resulted from the intrusion of water from the damaged portion.

DESCRIPTION OF THE INVENTION

Embodiments of the present invention will be described below in a further detailed way.

In the present specification, the term "X unit" means a structural unit constituting a polyurethane and derived from a compound X.

[1] Oil Gel:

The oil gel is an oil gel including a chain polyurethane (A), and a paraffin based oil (B). In the oil gel, it is presumed that the formation of the oil gel is caused by the similarity between the molecular structure of the chain saturated hydrocarbon compound included in the paraffin based oil (B), and the molecular structure of the chain polyurethane (A). In typical oil gels, macromolecules form a three-dimensional network, and an oil is held in gaps within this network. By contrast to this, it is presumed that the oil gel is formed by loose bonding between a chain moiety of the chain saturated hydrocarbon compound included in the paraffin based oil (B), and a chain moiety of the chain polyurethane (A) by means of hydrophobic interaction.

In the oil gel, the chain saturated hydrocarbon compound included in the paraffin based oil (B), and the chain polyurethane (A) are bonded to each other by weak force. As a result of this, the oil gel is highly flexible. When the oil gel is subjected to strong force, the bonding between the chain saturated hydrocarbon compound and the chain polyurethane is broken, and molecules of each of the chain saturated hydrocarbon compound and the chain polyurethane freely move. Therefore, although the oil gel has a specific shape, the oil gel exhibits behavior similar to the behavior of non-compressible fluids such as insulating oils. Therefore, the oil gel has an effect of, even when the oil gel is subjected to high hydraulic pressure, distributing the hydraulic pressure over the entirety of the oil gel so that this hydraulic pressure is equalized (hydraulic pressure equalizing effect).

As a result of the hydraulic pressure equalizing effect, the oil gel exhibits a very good pressure proof properties. Specifically, even when the oil gel is subjected to high hydraulic pressure or impact by pressure, pressure can be homogenously transferred to each of portions of the electronic device. As a result of this, the physical failure of the electronic device (crush due to deviation in pressure) can be effectively prevented. Even when the electronic device is subjected to high hydraulic pressure or change in pressure, the electronic device can normally operate.

In addition, the oil gel does not flow in such a manner that the insulating oil flows, and has the nature of retaining its own shape (shape retainability), and therefore, is characterized by not requiring a protective coat for covering the electronic device or an oil-tight structure. In addition, the oil gel is highly flexible, and even after solidification, can be easily peeled away. Therefore, the maintenance of the electronic device can be easily conducted. After the maintenance of the electronic device is completed, it is possible to impart pressure proof properties and the like to the electronic device again by covering the electronic device with the oil gel once again.

In general, "oil gel" refers to a disperse system containing an oil as a disperse medium. The "oil gel" in the present invention is a disperse system containing a paraffin based oil (B) as a disperse medium and a chain polyurethane (A) as a dispersoid. "Oil gels" exhibit intermediate nature between the nature of liquid and the nature of solid. Therefore, the "oil gel" in the present specification does not include liquid substances and rubbery substances (elastic bodies). In other words, the "oil gel" in the present specification is totally different from the gels consisting of highly elastic materials described in the patent literatures 1 and 2.

[1-1] Chain Polyurethane (A):

"Chain" in "chain polyurethane (A)" means to have a chain structure derived from a chain diol. This "chain structure" will be described in the section of "chain diol".

The chain polyurethane (A) is a chain polyurethane (A1) formed by polymerization of a chain diol (x) and a diisocyanate (y). In other words, the chain polyurethane (A) includes a repeating unit (chain diol unit) derived from the chain diol (x), and a repeating unit (diisocyanate unit) derived from the diisocyanate (y). As a result of polymerization of disubstituted compounds, i.e., a chain diol (x) and a diisocyanate (y), a polyurethane having a chain structure is formed instead of a polyurethane having a three-dimensional network structure.

[1-1a] Chain Diol (x):

The chain diol (x) is a compound obtained by replacing two hydrogen atoms in a chain saturated hydrocarbon compound with hydroxy groups. Among the chain diols, preference is given to a chain diol (chain paired-terminal diol) having a structure obtained by replacing two hydrogen atoms bonded to carbon atoms located at both ends of a chain saturated hydrocarbon compound with hydroxy groups.

"Chain" in "chain saturated hydrocarbon compound" means to be straight-chain or branched-chain, and not to have a cyclic structure. "Saturated" means not to have a carbon-carbon double bond or a carbon-carbon triple bond. Examples of hydrocarbon compounds not encompassed in "chain saturated hydrocarbon compound" include cyclic hydrocarbon compounds including a cyclic structure such as an alicyclic structure or an aromatic ring structure; and unsaturated hydrocarbon compounds such as polybutadiene and polyisoprenes. With regard to a chain diol derived from an unsaturated hydrocarbon compound, a polyurethane formed by the polymerization of this chain diol and a diisocyanate (y) tends to be rubbery (an elastic body), and as a result of this, the polymerization product tends to be hard. Therefore, a chain diol derived from an unsaturated hydrocarbon compound is not suitable for the purpose of forming a soft oil gel having a very good hydraulic pressure equalizing effect.

The chain diol (x) is preferably a hydrogenated polyisoprene diol (x1). Because the hydrogenated polyisoprene diol has a polyolefin chain, it is considered that the hydrogenated polyisoprene diol hydrophobically interacts with the chain saturated hydrocarbon compound in the paraffin based oil to form an oil gel. The hydrogenated polyisoprene diol (x1) does not include a carbon-carbon double bond, and therefore, has the following advantage: a polyurethane obtained by the polymerization thereof tends not to be rubbery (be an elastic body), and as a result of this, a soft oil gel can be formed.

The hydrogenated polyisoprene diol (x1) is preferably a hydrogenated polyisoprene diol having the content of hydroxy groups of 0.80 mol/kg or more and 1.0 mol/kg or less. In addition, the hydrogenated polyisoprene diol (x1) is preferably a hydrogenated polyisoprene diol having a bromine number of 1 g/100 g or more and 10 g/100 g or less. The content of hydroxy groups shall mean a value measured according to a measurement method according to JIS K 1557. The above-described bromine number shall mean a value measured according to a measurement method according to JIS K 0070.

The number averaged molecular weight of the chain diol (x) is preferably 1,000 or more and 5,000 or less, and further preferably 2,000 or more and 3,000 or less. This number averaged molecular weight shall mean a value measured according to a method according to ASTM D 2503.

It is considered that, when the number averaged molecular weight of the chain diol (x) is in the above-described range, the structure (chain length) of the chain saturated hydrocarbon compound as the main ingredient of the paraffin based oil (B1) having a kinetic viscosity at 40° C. of 20 mm$^2$/s or more and 100 mm$^2$/s or less, and the structure (chain length) of the chain moiety of the chain polyurethane (A1) become similar to each other, and as a result of this, hydrophobic interaction can be further facilitated to occur. The paraffin based oil (B1) contains a chain saturated hydrocarbon compound having an averaged molecular weight of 1,000 or less as a main ingredient. In order to achieve the chain length of the chain diol (x) similar to the chain length of a carbon chain in this chain saturated hydrocarbon compound, the number averaged molecular weight of the chain diol (x) is preferably set to be in the above-described range.

[1-1b] Diisocyanate (y):

The diisocyanate (y) is a compound obtained by replacing two hydrogen atoms in a saturated hydrocarbon compound with isocyanate groups. The "saturated hydrocarbon compound" mentioned here means chain saturated hydrocarbon compounds (including both straight-chain and branched-chain saturated hydrocarbon compounds), and alicyclic saturated hydrocarbon compounds.

The diisocyanate (y) is preferably a diisocyanate (y1) obtained by replacing two hydrogen atoms in the alicyclic saturated hydrocarbon compound with isocyanate groups.

The diisocyanate (y1) is preferably norbornane diisocyanate (y1a). With regard to the norbornane diisocyanate (y1a), a polyurethane formed by the polymerization of the norbornane diisocyanate (y1a) with the chain diol (x) exhibits high transparency in terms of a sense of sight and also in terms of electromagnetic theory of light, and can transmit infrared light, visible light and ultraviolet light with involving almost no loss of these lights. Therefore, the oil gel is suitably used as a pressure proof protective material for electronic devices such as, for example, electronic devices in the field of optics such as undersea cameras, and underwater illuminating apparatuses (including illumination of far-infrared light to ultraviolet light); electronic devices in the field of communication such as optical communication devices (transmitting devices, receiving devices and terminals of an optical fiber), antennas for mobile phone, and antennas for satellite communication; signal connecting devices such as undersea cables and undersea connectors; and ultra-precision magnetism measuring apparatuses such as sea-bottom fault measuring devices, mantle detectors, and sea-bottom geomagnetism sensors. The norbornane diisocyanate (y1a) can be 2,5-norbornane diisocyanate or 2,6-norbornane diisocyanate.

[1-1c] Molar Ratio of Chain Diol (x) and Diisocyanate (y):

In the formation of the polyurethane (A1) by polymerization, a chain diol (x) and a diisocyanate (y) are preferably reacted in equimolar. In other words, the chain diol (x) and the diisocyanate (y) are preferably reacted so that the molar ratio of a hydroxy group in the chain diol (x) and an isocyanate group in the diisocyanate (y) is equimolar (theoretical value).

[1-2] Paraffin Based Oil (B):

The paraffin based oil means an oil containing a paraffin (chain saturated hydrocarbon compound) as a main ingredient.

Examples of the paraffin based oil include paraffin based process oil.

The paraffin based oil (B) is a paraffin based oil (B1) having a kinetic viscosity at 40° C. of 20 mm$^2$/s or more and 100 mm$^2$/s or less. In particular, the paraffin based oil (B) is preferably a paraffin based oil (B1a) having a kinetic viscosity at 40° C. of 85 mm$^2$/s or more and 95 mm$^2$/s or less. The kinetic viscosity at 40° C. shall mean a value measured according to a measurement method according to JIS K2283. The kinetic viscosity of the paraffin based oil correlates with the molecular weight (that can be considered as the chain length of carbon chain) of the chain saturated hydrocarbon compound as a main ingredient. When the paraffin based oil (B1) having a kinetic viscosity at 40° C. of 100 mm$^2$/s or less is used, an oil gel having very good pressure proof properties is formed by this paraffin based oil (B1) and in particular, a chain polyurethane containing a chain diol unit having a number averaged molecular weight of 1,000 or more and 5,000 or less. When the oil gel is obtained by a two-component mixing method, easy mixing can be achieved under conditions at room temperature (15° C. or more and 45° C. or less) without using a stirring apparatus such as a stirrer.

The weight averaged molecular weight of the paraffin based oil (B) is preferably 265 or more and 1060 or less, and preferably 430 or more and 630 or less. This weight averaged molecular weight shall mean a value determined by gel permeation chromatography (GPC) in terms of polystyrene on the basis of monodispersed polystyrene.

[1-3] Additive:

The oil gel can contain a variety of additives as long as these additives does not inhibit pressure proofing effects and water proofing effects of the oil gel. Examples of a variety of additives include ultraviolet absorbers (such as benzotriazole based ultraviolet absorbers); antioxidants (hindered phenol based antioxidant); and defoamers (for example, silicone based defoaming agents). With regard to these additives, in order to achieve homogeneously mixed state, it is preferable to use additives that are in the form of liquid or oil-soluble at room temperature (25° C.)

[1-4] Composition Ratio:

In the above-described oil gel, the chain polyurethane (A1) is included at a proportion of 10% by mass or more and 50% by mass or less based on the total amount of the chain polyurethane (A1) and the paraffin based oil (B1). By achieving the above-described range, it is possible to form an oil gel having very good pressure proof properties and waterproof properties. Above 50% by mass, the nature of the product rapidly changes, and the nature of an elastic body is exhibited. In other words, the nature of the oil gel is not exhibited, and effects of the present invention are not achieved. Below 10% by mass, the shape retainability of the gel decreases. In order to further improve pressure proof properties and waterproof properties, it is preferable that the chain polyurethane (A1) is included at a proportion of 20% by mass or more and 40% by mass or less based on the total amount of the chain polyurethane (A1) and the paraffin based oil (B1).

[2] Pressure Proof Material for Protecting an Electronic Device:

The above-described oil gel has pressure proof properties and electrical insulating properties analogous to those of the paraffin based oil (B), and in addition, because of being in the form of gel, has very good shape retainability (shape retaining ability) and close adhesion properties. Therefore, the above-described oil gel has very good pressure proof properties and waterproof properties, and can be conveniently used as a pressure proof material for protecting an electronic device.

Figure 1:
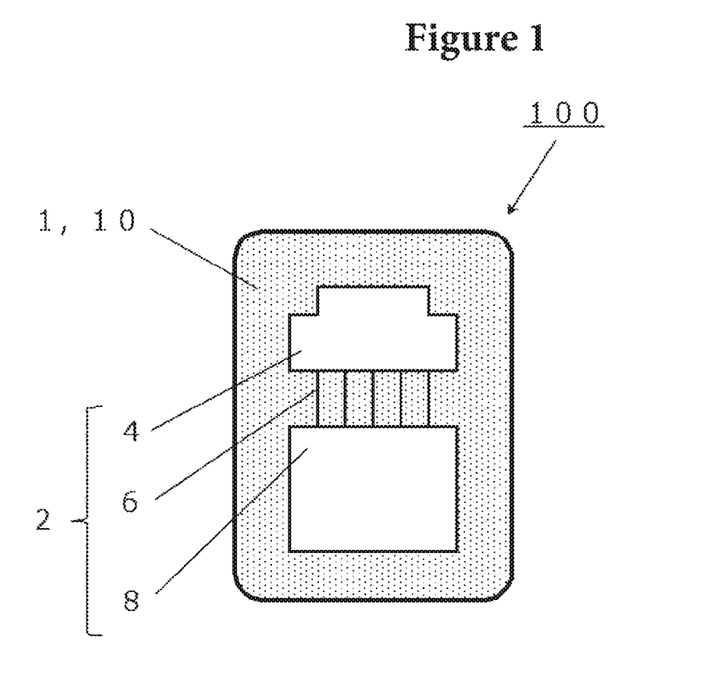
FIG. 1 shows a conceptual diagram schematically illustrating one aspect of using an oil gel of the present invention.

FIG. 1 is a conceptual diagram schematically illustrating one aspect of using an oil gel of the present invention. The pressure proof electronic device 100 shown in FIG. 1 includes an electronic device 2, and a pressure proof protective layer 10 fully covering the surroundings of the electronic device 2. The pressure proof protective layer 10 is formed by an oil gel 1 of the present invention.

The electronic device 2 is composed of a sensor 4, wiring 6 and an electronic circuit 8, and has a structure obtained by connecting the sensor 4 and the electronic circuit 8 by means of the wiring 6. Because of the covering of the electronic device 2 with the pressure proof protective layer 10, the sensor 4, the wiring 6, and the electronic circuit 8 are integrated. The sensor 4 is a hydraulic pressure sensor.

Figure 2:
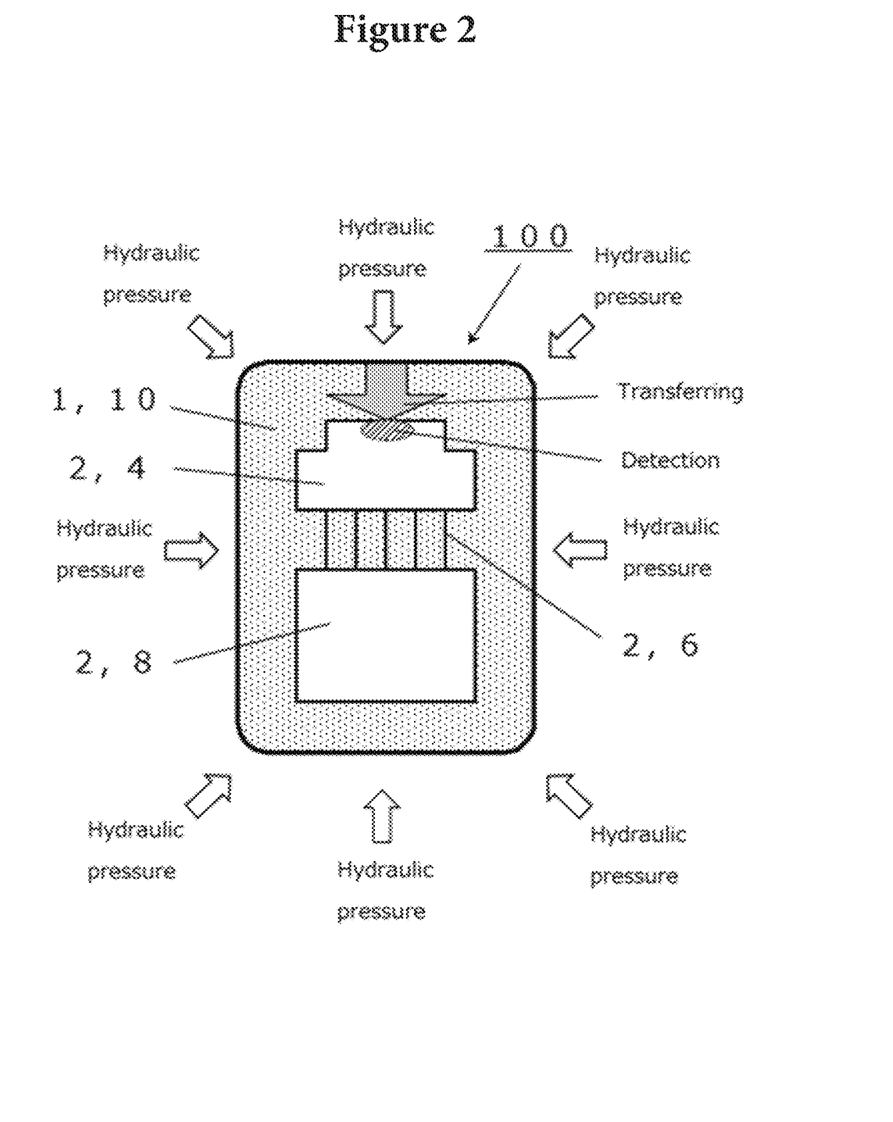
FIG. 2 shows a conceptual diagram schematically illustrating the state of a pressure proof material using an oil gel of the present invention when the pressure proof material is subjected to hydraulic pressure.

FIG. 2 is a conceptual diagram schematically illustrating the state of an oil gel of the present invention when the oil gel is subjected to hydraulic pressure. As shown in FIG. 2, when the pressure proof protective layer 10 is subjected to an external pressure (hydraulic pressure), this external pressure (hydraulic pressure) is uniformly distributed in terms of pressure over the pressure proof protective layer 10, and the external pressure (hydraulic pressure) is uniformly transferred to the entirety of the electronic device 2 covered with the pressure proof properties protective layer 10 without any delay. As a result of this, the balance between the external pressure applied to the pressure proof protective layer 10, and the internal pressure applied to the electronic device 2 is maintained to prevent the physical failure in the electronic device 2 effectively.

The electronic device is not limited to the example shown in FIG. 1. Examples of the electronic device include marine sensors other than hydraulic pressure sensors (such as water temperature sensors, electrical conductivity sensors, and sensors for drilling methane hydrate); undersea cameras; underwater illuminating apparatuses (including illumination of far-infrared light to ultraviolet light); marine buoys; undersea cable; undersea electricity-generating apparatuses; and sea-bottom seismographs.

[3] Oil Gel Former:

The oil gel can be produced by a so-called two-component mixing process. For example, an oil gel former comprising a first solution including a chain diol (x) and a paraffin based oil (B1), in combination with a second solution including a diisocyanate (y) and a paraffin based oil (B1) can be used to produce the oil gel. When the first solution and the second solution are mixed, a chain polyurethane (A1) is formed by the polymerization of the chain diol (x) in the first solution, and the diisocyanate (y) in the second solution.

In this oil gel former, the first solution and the second solution can include the chain diol (x), the diisocyanate (y) and the paraffin based oil (B1) such that 10% by mass or more and 50% by mass or less of the chain polyurethane (A1) is formed based on the total amount of the chain polyurethane (A1), the paraffin based oil (B1) included in the first solution, and the paraffin based oil (B1) included in the second solution. In order to promote the polymerization (eventually, gelation), a conventionally known reaction catalyst can be added to the first solution. For example, an organic tin compound such as dibutyl tin dilaurate can be used.

The detailed specification with regard to the chain paired-terminal diol (x), the diisocyanate (y) and the paraffin based oil (B) is as described in the section of the oil gel. The first solution and the second solution can be mixed even under conditions at room temperature of 15° C. or more and 45° C. or less (without heating such as heating in hot water) to form the above-described chain polyurethane (A) by polymerization reaction. As a result of this, an oil gel formed by the chain polyurethane (A) and the paraffin based oil (B) can be obtained.

The mixing method is not limited in particular. Examples of the mixing method include a method for weighing the first solution and the second solution, placing the metered first solution and the second solution into a plastic bag equipped with a zipper, and mixing the first solution and the second solution in the interior of the plastic bag. In this mixing, it is preferable that the second solution and the first solution are placed into the plastic bag in this order to mix the second solution and the first solution.

The temperature for mixing is also not limited in particular. In this regard, it is necessary to provide a temperature at which the first solution and the second solution become well compatible with each other, and is mixed into one another. Specifically, the temperature of mixing is preferably 15° C. or more and 45° C. or less, and further preferably 15° C. or more and 25° C. or less.

When an electronic device is covered with the oil gel, the electronic device is placed in the interior of a bottomed container, and subsequently, a mixed solution of the first solution and the second solution is injected into the interior of the bottomed container to deposit the mixed solution on the surroundings of the electronic device.

As the "bottomed container", plastic cup and a plastic case can be used, for example. By injecting the mixed solution into the bottomed container until the entirety of the electronic device is fully immersed in the mixed solution, it is possible to deposit the mixed solution on the surroundings of the electronic device.

In the mixed solution, the reaction of the chain diol (x) and the diisocyanate (y) proceeds with the passage of time to cause the gelation of the mixed solution. The time required for the gelation to the extent that no liquid leakage of the mixed solution occurs is about 3 hours, and the time required for the full gelation is about 24 hours. When the mixed solution is subjected to gelation, a pressure proof protective layer consisting of the oil gel derived from the mixed solution is formed in the surroundings of the electronic device.

EXAMPLES

The present invention will be described below in a further detailed manner by using Examples. In this regard, the present invention is not limited only to aspects in the following Examples.

Reference Examples 1 to 16

First solutions including a chain diol (x) and a paraffin based oil (B) as shown in Table 1 were prepared (Reference Examples 1 to 7). Dibutyl tin dilaurate was added as a reaction catalyst to the first solutions. Dibutyl tin dilaurate was added at a proportion of 0.05 g per 100 g of the first solution. The detailed specification is shown in Table 1.

Second solutions including a diisocyanate (y) and a paraffin based oil (B) as shown in Table 2 were prepared (Reference Examples 8 to 14). The detailed specification is shown in Table 2. The amount of the chain diol (x) and the diisocyanate (y) were adjusted so that the chain diol (x) and the diisocyanate (y) were equimolar based on the molecular weight of both of the chain diol (x) and the diisocyanate (y). When the content of the chain polyurethane was greater than 52% by mass, it is impossible to mix the first solution and the second solution in 1:1, and therefore, the amount of the paraffin based oil was appropriately adjusted.

As the chain diol (x) shown in Table 1, a hydrogenated polyisoprene diol having a structure in which one of hydroxy groups was respectively attached to both terminals of the backbone of hydrogenated polyisoprene was used. The detailed specification is shown in Table 3.

As the paraffin based oils shown in Table 1 and Table 2, a paraffin based oil containing a paraffin (chain saturated hydrocarbon compound) as a main ingredient, having a kinetic viscosity at 40° C. of 88.96 mm$^2$/s, having a saturate content (the proportion of saturated hydrocarbon compound) of 90% by mass or more, and having a weight averaged molecular weight of 530 was used. As the diisocyanate shown in Table 2, norbornane diisocyanate (NBDI) was used.

TABLE 1

|  |  |  | Reference Example 1 | Reference Example 2 | Reference Example 3 | Reference Example 4 | Reference Example 5 | Reference Example 6 | Reference Example 7 |
|---|---|---|---|---|---|---|---|---|---|
| Composition | Chain diol | g | 16.8 | 33.5 | 50.3 | 67.1 | 83.8 | 100.6 | 134.2 |
|  | Paraffin based oil |  | 73.2 | 56.5 | 39.7 | 22.9 | 6.2 | — | — |
|  | Total |  | 90.0 | 90.0 | 90.0 | 90.0 | 90.0 | 100.6 | 134.2 |

TABLE 2

|  |  |  | Reference Example 8 | Reference Example 9 | Reference Example 10 | Reference Example 11 | Reference Example 12 | Reference Example 13 | Reference Example 14 |
|---|---|---|---|---|---|---|---|---|---|
| Composition | diisocyanate | g | 1.2 | 2.5 | 3.7 | 4.9 | 6.2 | 7.4 | 9.8 |
|  | Paraffin based oil |  | 88.8 | 87.5 | 86.3 | 85.1 | 83.8 | 72.0 | 36.0 |
|  | Total |  | 90.0 | 90.0 | 90.0 | 90.0 | 90.0 | 79.4 | 45.8 |

TABLE 3

|  |  |  | Hydrogenated polyisoprene diol |
|---|---|---|---|
| Physical properties | Number averaged molecular weight |  | 2500 |
|  | Viscosity (30° C.) | mPa·s | 75 |
|  | Content of hydroxy group | mol/kg | 0.90 |
|  | Bromine number | g/100 g | 5 |

Examples 1

90.0 g of the first solution of Reference Example 1, and 90.0 g of the second solution of Reference Example 8 were weighed by an electronic balance having accuracy in terms of 0.05 g, were mixed in a mass ratio of 1:1 to obtain 180 g of mixed solution. This mixing was conducted by a method in which, under conditions at room temperature (25° C.), the first solution and the second solution were encased in a plastic bag equipped with a zipper, and the plastic bag equipped with a zipper was externally kneaded by hand. 160 g of this mixed solution was injected into a case made of an acrylic resin and having length of 69 mm×width of 69 mm×height of 59 mm, and was allowed to stand 24 hours to obtain a product.

Examples 2 to 5, Comparative Examples 1 to 2

The products were obtained in the same manner as in Example 1 except that the type of the first solution or the second solution was changed as described in Table 4.

TABLE 4

|  |  |  | Example 1 | Example 2 | Example 3 | Example 4 |
|---|---|---|---|---|---|---|
| First solution |  |  | Reference Example 1 | Reference Example 2 | Reference Example 3 | Reference Example 4 |
| Second Solution |  |  | Reference Example 8 | Reference Example 9 | Reference Example 10 | Reference Example 11 |
| Composition | Paraffin based oil (g) |  | 144 | 128 | 112 | 96 |
|  | Amount of chain diol + diisocyanate (g) |  | 16 | 32 | 48 | 64 |
|  | Content of chain polyurethane (% by mass) |  | 10 | 20 | 30 | 40 |
| Physical properties | Mixing properties |  | Good | Good | Good | Good |
|  | Curing state | 24 h | Fair | Fair | Fair | Good |
|  |  | 48 h | Fair | Fair | Good | Good |
|  |  | 72 h | Fair | Fair | Good | Good |
|  | Transparency |  | Fair | Fair | Good | Good |
|  | Peelability |  | Good | Good | Good | Excellent |
|  | Signal output | 24 h | Excellent | Excellent | Excellent | Excellent |
|  |  | 48 h | Excellent | Excellent | Excellent | Excellent |
|  |  | 72 h | Excellent | Excellent | Excellent | Excellent |
|  |  | During pressurization at 5.5 MPa | Excellent | Excellent | Excellent | Excellent |
|  |  | After depressurization to atmospheric pressure | Excellent | Excellent | Excellent | Excellent |
|  |  | During the cycle of the burst test at 12 MPa | Excellent | Excellent | Excellent | Excellent |
|  |  | After depressurization to atmosphere pressure | Excellent | Excellent | Excellent | Excellent |
|  |  | 24 h after removed from the pressurized water tank | Excellent | Excellent | Excellent | Excellent |
|  | Pressure proof properties |  | Good | Excellent | Excellent | Excellent |
|  | Waterproof properties |  | Good | Excellent | Excellent | Excellent |

TABLE 4-continued

|  |  | Example 5 | Comparative Example 1 | Comparative Example 2 |
|---|---|---|---|---|
| First solution | | Reference Example 5 | Reference Example 6 | Reference Example 7 |
| Second Solution | | Reference Example 12 | Reference Example 13 | Reference Example 14 |
| Composition | Paraffin based oil (g) | 80 | 64 | 32 |
| | Amount of chain diol + diisocyanate (g) | 80 | 96 | 128 |
| | Content of chain polyurethane (% by mass) | 50 | 60 | 80 |
| Physical properties | Mixing properties | Fair | Poor | Poor |
| | Curing state 24 h | Good | Good | Good |
| | 48 h | Good | Good | Good |
| | 72 h | Good | Good | Good |
| | Transparency | Good | Good | Good |
| | Peelability | Excellent | Excellent | Fair |
| | Signal output 24 h | Excellent | Excellent | Excellent |
| | 48 h | Excellent | Excellent | Excellent |
| | 72 h | Excellent | Excellent | Excellent |
| | During pressurization at 5.5 MPa | Excellent | Excellent | Excellent |
| | After depressurization to atmospheric pressure | Excellent | Excellent | Excellent |
| | During the cycle of the burst test at 12 MPa | Excellent | Excellent | Good |
| | After depressurization to atmosphere pressure | Excellent | Good | Good |
| | 24 h after removed from the pressurized water tank | Excellent | Good | Good |
| | Pressure proof properties | Fair | Poor | Poor |
| | Waterproof properties | Good | Good | Good |

[Evaluation of Mixing Properties, Curing State and Transparency]

The mixing properties of the first solution and the second solution, and the curing state and the transparency of the obtained products were evaluated by the following method. The results are shown in Table 4.

(Mixing Properties <25° C.>)

When the first solution and the second solution were mixed, mixing properties <25° C.> were evaluated by the time required for achieving homogenous mixing of these two solutions.

(1) "Good" was assigned to the case where the homogenous mixing was achieved within 2 minutes after the initiation of mixing.

(2) "Fair" was assigned to the case where the homogenous mixing was achieved within 5 minutes after the initiation of mixing.

(3) "Poor" was assigned to the case where the homogenous mixing was not achieved within 5 minutes after the initiation of mixing.

(Curing State)

The first solution and the second solution were mixed, and subsequently, the state of the product at the time points of 24 hours, 48 hours and 72 hours was visually observed to evaluate the curing state of the product.

(1) "Good" was assigned to the case where the product was in the form of gel, and even when the case containing the product was slanted, the product did not lose its own shape and the shape of the product was retained.

(2) "Fair" was assigned to the case where the product was in the form of swelled gel (in the form of lax jelly), and when the case containing the product was slanted, the product lost its own shape.

(3) "Poor (liquid state)" was assigned to the case where the product was in liquid state.

(4) "Poor (rubbery)" was assigned to the case where the product was rubbery (as hard as solidified silicone coking).

(Transparency)

The first solution and the second solution were mixed, and subsequently, the degree of transparency and the color tone of the product at the time point of 24 hours were visually observed to evaluate the transparency of the product.

(1) "Good" was assigned to the case where the product was colorless and transparent.

(2) "Fair" was assigned to the case where the product slightly became cloudy and was translucent.

(3) "Poor" was assigned to the case where the product was colored and opaque.

[Evaluation of Pressure Proof Properties, Waterproof Properties and Peelability]

(Signal Output)

An electronic circuit equipped with a microprocessor was disposed in the interior of a case made of an acrylic resin (length of 69 mm×width of 69 mm×height of 59 mm). As the electronic circuit, an electronic circuit having the trade name of "AE-PIC18" (manufactured by Akizuki Denshi Tshusho Co., Ltd.) was used. The electronic circuit had the following size: a length of 18 mm×a width of 52 mm×a component height of 23 mm (a base plate thickness of 1.5 mm). The electronic circuit was equipped with a cable for the connection to an external device. The electronic circuit was connected to a DC power supply and a PC (personal computer) through the cable.

Subsequently, 160 g of mixed solution of the first solution and the second solution was injected into the interior of the case to deposit the mixed solution on the surroundings of the electronic circuit. After the passage of 24 hours at room temperature (25° C.), the mixed solution underwent gelation to form a pressure proof protective layer consisting of an oil gel derived from the mixed solution (hereinbelow, the entirety of the electronic circuit on which the pressure proof protective layer has been formed is referred to as a "pressure proof electronic circuit"). The surroundings of the electronic circuit were fully covered with the pressure proof protective layer.

Signal output from the electronic circuit was confirmed at atmospheric pressure (0 MPa) in the atmosphere. The pressure proof protective layer was formed on the electronic circuit, and after the passage of 24 hours, 48 hours and 72 hours, the electronic circuit was energized, and electrical output from the electronic circuit was measured to confirm signal output from the electronic circuit.

Signal output was confirmed at atmospheric pressure (0 MPa) in the atmosphere, and subsequently, the pressure proof electronic circuit together with the case was placed into a pressurized water tank (medium-sized water tank for high pressure experimentation). The signal output in pressurization-depressurization cycle was confirmed by subjecting the pressurized water tank (medium-sized water tank for high pressure experimentation) to pressurization-depressurization operation by means of the following cycle.

(i) Pressurization was conducted at pressurization rate of 0.1 MPa/sec from 0 MPa (atmospheric pressure) to 5.6 MPa.

(ii) The state under pressurization at 5.6 MPa was held for 10 minutes.

(iii) Depressurization from 5.6 MPa (the state under pressurization) to 0 MPa (atmospheric pressure) was conducted at depressurization rate of 0.1 MPa/sec.

(iv) The pressure proof electronic circuit was removed from the pressurized water tank, and the pressure proof electronic circuit was visually confirmed followed by taking a photograph of the pressure proof electronic circuit (At this time, the pressure proof protective layer and the electronic circuit were checked whether or not imperfections such as water intrusion were present).

(v) Pressurization from 0 MPa (atmospheric pressure) to 12 MPa was conducted in 5 seconds.

(vi) the state under pressurization at 12 MPa was held for 10 minutes.

(vii) Depressurization from 12 MPa to 0 MPa (atmospheric pressure) was conducted in 5 seconds.

(viii) Holding at 0 MPa for 10 minutes was conducted (Steps (v) to (viii) are referred to as "burst test").

(ix) The burst test is repeated two times further (the burst test is conducted three times at total).

(x) The pressure proof electronic circuit was removed from the pressurized water tank, and the pressure proof electronic circuit was visually confirmed followed by taking a photograph of the pressure proof electronic circuit (At this time, the pressure proof protective layer and the electronic circuit were checked whether or not imperfections such as water intrusion were present).

(xi) The pressure proof electronic circuit was removed from the pressurized water tank, and after the passage of 24 hours, signal output at atmospheric pressure (0 MPa) in the atmosphere was confirmed.

The reason why the pressurization at 5.6 MPa or 12 MPa was conducted in the above-described cycle is as follows.
(1) 5.6 MPa:
"Deep sea (Abyssal)" in the field of ship is defined as a depth of water of 300 fathoms (545.4 m). The hydraulic pressure of 5.6 MPa was calculated by means of multiplying the hydraulic pressure at this depth of water by the mean specific gravity (1.025) of the sea water.
(2) 12 MPa:
The burst test, which repeats pressurization-depressurization cycles in a short period of time, is for the purpose of evaluating (a) resistance to change in hydraulic pressure; and (b) long-term durability.

Specifically, the burst test, which repeats pressurization-depressurization cycles in which pressurization from 0 MPa to 12 MPa, and subsequently, depressurization to 0 MPa are conducted, has the following two meanings.
(a) The resistance of the sample to change in hydraulic pressure is evaluated by simulating the situation in which the sample is subjected to change in hydraulic pressure corresponding to 30 MPa to 36 MPa (3,000 m to 3,600 m in terms of the depth of water).
(b) The long-term durability of the sample is evaluated by simulating the situation in which the sample is immersed under hydraulic pressure of 5.6 MPa for 72 hours.

The signal output was evaluated by confirming whether or not signals were normally output from the electronic circuit (whether or not change in frequency and the interruption of signals occur). The signal output was continuously confirmed during the above-described pressurization-depressurization cycles. The signals were output by using a built-in clock of the electronic circuit and a resonator.

The signal output from the electronic circuit was confirmed by monitoring
(1) the digital signals of 2 MHz obtained by subjecting the clock output to frequency dividing,
(2) the voltage (analog signal) obtained by subjecting the digital output to F-V change, and
(3) the UART signals (Universal Asynchronous Receiver Transmitter: a certain 16-byte ASCII code to be monitored) having a cycle of 38,461 Hz.

(1) "Excellent" was assigned to the case where the digital signals, the voltage and the UART signals were normally output from the electronic circuit, and the electronic circuit normally operated (specifically, in the case where, in the above-described pressurization-depressurization processes (i) to (xi), fluctuation in frequency of the digital signal and the voltage was not identified, and the interruption of the UART signals or the missing of data was not identified).

(2) "Good" was assigned to the case where the digital signals, the voltage and the UART signals were roughly normally output from the electronic circuit, and the electronic circuit normally operated (specifically, the case where, in the above-described pressurization-depressurization processes (i) to (xi), fluctuation in frequency of the digital signal and the voltage was identified within the range of ±3%, but the interruption of the UART signals and the missing of data were not identified).

(3) "Fair" was assigned to the case where abnormal conditions to some extent were identified with regard to the output of the digital signals, the voltage and the UART signals from the electronic circuit, but the electronic circuit roughly normally operated (specifically, the case where, in the above-described pressurization-depressurization processes (i) to (xi), fluctuation in frequency of the digital signal or the voltage beyond the range of ±3% was identified, but the interruption of the UART signals and the missing of data described above were within 4 times or less).

(4) "Slightly poor" was assigned to the case where abnormal conditions to some extent were identified with regard to the output of the digital signals, the voltage and the UART signals from the electronic circuit, and abnormal conditions to some extent were identified with regard to the operation of the electronic circuit (specifically, the case where, in the above-described pressurization-depressurization processes (i) to (xi), fluctuation in frequency of the digital signal or the voltage beyond the range of ±3% was identified, and in addition, the interruption of the UART signals and the missing of data were identified five times or more).

(5) "Poor" was assigned to the case where the electronic circuit did not operate.
(Pressure Proof Properties)
In the evaluation of the signal output, with regard to after pressurization to 5.6 MPa and after pressurization to 12 MPa (This means to be after conducting the burst test three times. This meaning is also applicable to the following description), pressure proof properties were evaluated by confirming decrease in the volume of the pressure proof protective layer (oil gel), and whether or not cracks (water intrusion pathway) in communication with the outside were formed. Due to hydraulic pressure, volume of the pressure proof protective layer decreases, cracks in communication with the outside are formed in the pressure proof protective layer, or a water intrusion pathway is formed in the portion of the pressure proof protective layer that is in contact with the cable or a surface of the wall of the case, and as a result of these, the pressure proof protective layer does not effectively function. In other words, decrease in the volume of the pressure proof protective layer, and cracks or water intrusion pathways formed in the pressure proof protective layer cause the failure of the electronic circuit, or cause problems in the operation of the electronic circuit.

(1) With regard to both of after pressurization to 5.6 MPa and after pressurization to 12 MPa, change in volume of the pressure proof protective layer was not identified, and cracks and water intrusion pathway were not formed in the pressure proof protective layer. "Excellent" was assigned to this case.

(2) With regard to both of after pressurization to 5.6 MPa and after pressurization to 12 MPa, change in volume of the pressure proof protective layer was not identified, and cracks and water intrusion pathway were not formed in the pressure proof protective layer. However, after pressurization to 12 MPa, a portion of the pressure proof protective layer was peeled away from a surface of the wall of the case, and water intrusion pathway was formed. "Good" was assigned to this case.

(3) With regard to both of after pressurization to 5.6 MPa and after pressurization to 12 MPa, change in volume of the pressure proof protective layer was not identified. However, with regard to both of after pressurization to 5.6 MPa and after pressurization to 12 MPa, cracks or water intrusion pathways not in communication with the outside were formed in the pressure proof protective layer. "Slightly poor" was assigned to this case.

(4) After pressurization to 12 MPa, the decrease in the volume of the pressure proof protective layer was identified, and cracks or water intrusion pathways in communication with the outside were formed in the pressure proof protective layer. Then, the evidence of water intrusion was actually identified. "Poor" was assigned to this case.

(Waterproof Properties)

Waterproof properties of the pressure proof protective layer were evaluated based on the evaluation of the signal output. When the pressure proof protective layer was inadequate in terms of waterproof properties, water may intrude in the interior of the pressure proof protective layer to cause abnormal conditions with regard to the operation of the electronic circuit.

(1) "Excellent" was assigned to the case where all of the evaluations of the signal output was "Excellent" at all of the time points at which the measurement was conducted.

(2) "Good" was assigned to the case where the evaluation of the signal output was any of "Excellent" and "Good" at all of the time points at which the measurement was conducted.

(3) "Fair" was assigned to the case where the evaluation of the signal output was any of "Excellent", "Good" and "Fair" at all of the time point at which the measurement was conducted.

(4) "Slightly poor" was assigned to the case where the evaluation of the signal output involved no "Poor" and at least one "Slightly poor" at all of the time points at which the measurement was conducted.

(5) "Poor" was assigned to the case where the evaluation of the signal output involved at least one "Poor".

(Peelability)

After the evaluation of the signal output was completed (after the above-described process of (xi) was completed), the peelability was evaluated by the behavior and the state in the event of peeling the pressure proof protective layer from the case.

(1) "Excellent" was assigned to the case where the pressure proof protective layer was able to be successfully peeled away without leaving the pressure proof protective layer (oil gel) on the case, and oil components were not deposited on the case.

(2) "Good" was assigned to the case where the pressure proof protective layer was able to be successfully peeled away without leaving the pressure proof protective layer on the case, but oil components were deposited on the case.

(3) "Fair" was assigned to the case where a portion of the pressure proof protective layer was left on the case, and the pressure proof protective layer was not able to be successfully peeled away.

(4) "Poor" was assigned to the case where the case and pressure proof protective layer were adhered to each other, and the pressure proof protective layer was not able to be peeled away from the case.

(Evaluation)

In all of the evaluations, Examples 1 to 5 involved no "Slightly poor" and "Poor", and were rated as "Excellent", "Good" or "Fair". In particular, all of Examples 2 to 4 involving the content of the chain polyurethane of 20% or more and 40% or less were "Excellent" with regard to pressure proof properties and waterproof properties.

With regard to Comparative Examples 1 and 2, the evaluation of pressure proof properties was "Poor". In other words, decrease in the volume of the pressure proof protective layer, the formation of cracks or water intrusion pathways in communication with the outside, and the evidence of water intrusion have been identified with regard to the sample, and in a view point for a long period of time, it has been considered that the pressure proof protective layer would not be able to function effectively, and as a result of this, there might be a possibility of causing the failure of the electronic circuit, or causing problems in the operation of the electronic circuit.

The evaluation of waterproof properties in Comparative Example 1 or 2 was "Good". However, this evaluation is results of the evaluation based on signal output. In fact, with regard to Comparative Examples 1 and 2, decrease in the volume of the pressure proof protective layer, the formation of cracks or water intrusion pathways in communication with the outside, and the evidence of water intrusion have been identified. In other words, with regard to Comparative Examples 1 and 2, it has been considered in a view point for a long period of time that water intrusion at a level having influence on the signal output would occur, and as a result of this, there might be a possibility of causing the failure of the electronic circuit, or causing problems in the operation of the electronic circuit.

In addition, in Comparative Examples 1 and 2, the evaluation of mixing properties was "Poor". The curing was initiated immediately after mixing of the first solution and the second solution, and the state of viscous mizuame was exhibited, and therefore, the homogenous mixing was not able to be conducted within 5 minutes after the initiation of mixing.

INDUSTRIAL APPLICABILITY

The oil gel of the present invention can be conveniently used as a pressure proof material for protecting an electronic device from a high hydraulic pressure at a hydraulic pressure level of 5.6 MPa (corresponding to deep sea at a depth of water of 548.64 m). Specifically, the oil gel of the present invention can be particularly conveniently used as a pressure proof material for protecting marine sensors <such as hydraulic pressure sensors, water temperature sensors, electrical conductivity sensors, and sensors for drilling methane hydrate>, undersea cameras, underwater illuminating apparatuses (including illumination of far-infrared light to ultraviolet light), marine buoys, undersea cables, undersea electricity-generating apparatus, sea-bottom seismographs, and the like.

REFERENCE SIGNS LIST

1: oil gel, 2: electronic device, 4: sensor, 6: wiring, 8: electronic circuit, 10: pressure proof protective layer, 100: pressure proof electronic device.

The invention claimed is:

1. An oil gel comprising:
a chain polyurethane (A) and a paraffin based oil (B),
wherein the chain polyurethane (A) is a chain polyurethane (A1) formed by polymerization of a chain diol (x) and a diisocyanate (y), and
wherein the chain diol (x) is a compound obtained by replacing two hydrogen atoms in a chain saturated hydrocarbon compound with hydroxy groups, and
wherein the chain diol (x) is a hydrogenated polyisoprene diol (x1), and
wherein the diisocyanate (y) is a compound obtained by replacing two hydrogen atoms in a saturated hydrocarbon compound with isocyanate groups, and
the paraffin based oil (B) is a paraffin based oil (B1) having a kinetic viscosity at 40° C. of 20 $mm^2/s$ or more and 100 $mm^2/s$ or less, and
the chain polyurethane (A1) is included at a proportion of 10% by mass or more and 50% by mass or less based on the total amount of the chain polyurethane (A1) and the paraffin based oil (B1).

2. The oil gel according to claim 1, wherein the chain polyurethane (A1) is included at a proportion of 20% by mass or more and 40% by mass or less based on the total amount of the chain polyurethane (A1) and the paraffin based oil (B1).

3. The oil gel according to claim 1, wherein the number averaged molecular weight of the chain diol (x) is 1,000 or more and 5,000 or less.

4. The oil gel according to claim 1, wherein the diisocyanate (y) is a diisocyanate (y1) obtained by replacing two hydrogen atoms in an alicyclic saturated hydrocarbon compound with isocyanate groups.

5. The oil gel according to claim 4, wherein the diisocyanate (y1) is a norbornane diisocyanate (y1a).

6. The oil gel according to claim 1, wherein the paraffin based oil (B) is a paraffin based oil (B1a) having a kinetic viscosity at 40° C. of 85 $mm^2/s$ or more and 95 $mm^2/s$ or less.

7. A pressure proof material for protecting an electronic device, the pressure proof material comprising the oil gel according to claim 1.

8. An oil gel former comprising:
a first solution including a chain diol (x) obtained by replacing two hydrogen atoms in a chain saturated hydrocarbon compound with hydroxy groups, the chain diol (x) being a hydrogenated polyisoprene diol (x1); and a paraffin based oil (B1) having a kinetic viscosity at 40° C. of 20 $mm^2/s$ or more and 100 $mm^2/s$ or less, in combination with
a second solution including a diisocyanate (y) obtained by replacing two hydrogen atoms in a saturated hydrocarbon compound with isocyanate groups; and a paraffin based oil (B1) having a kinetic viscosity at 40° C. of 20 $mm^2/s$ or more and 100 $mm^2/s$ or less,
wherein when the first solution and the second solution are mixed, a chain polyurethane (A1) is formed by polymerization of the chain diol (x) in the first solution and the diisocyanate (y) in the second solution, and
wherein the first solution and the second solution include the chain diol (x), the diisocyanate (y) and the paraffin based oil (B1) such that 10% by mass or more and 50% by mass or less of the chain polyurethane (A1) is formed based on the total amount of the chain polyurethane (A1), the paraffin based oil (B1) included in the first solution, and the paraffin based oil (B1) included in the second solution.

* * * * *